Dec. 4, 1923.
A. W. WHARTON
AUTOMOBILE BUFFER
Filed Oct. 20, 1922
1,476,478
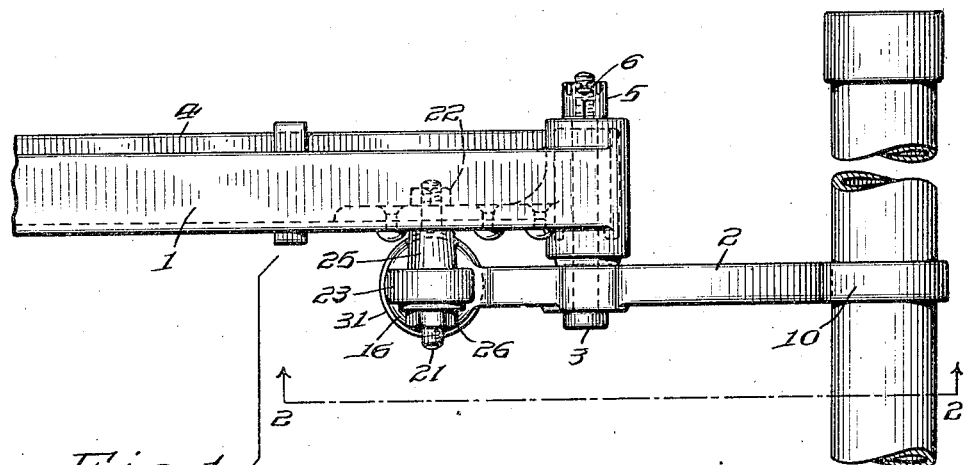
Fig. 1.
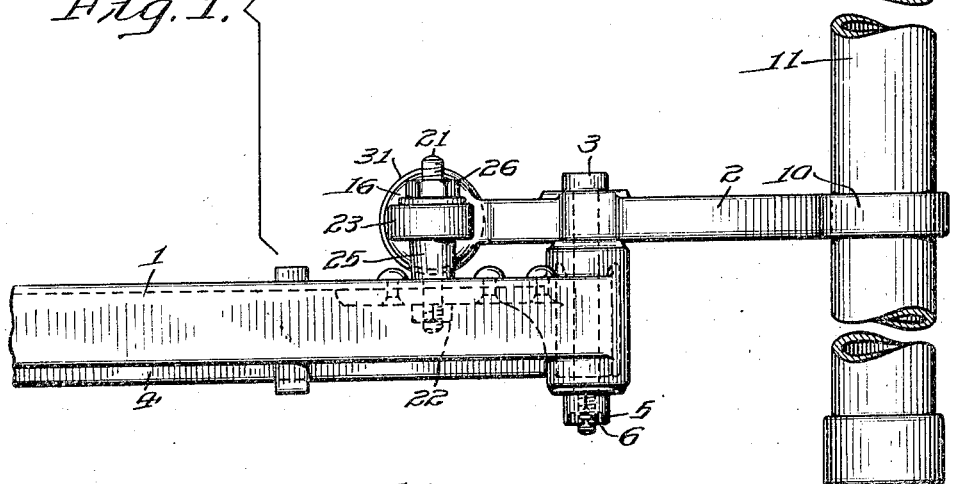
Fig. 2.
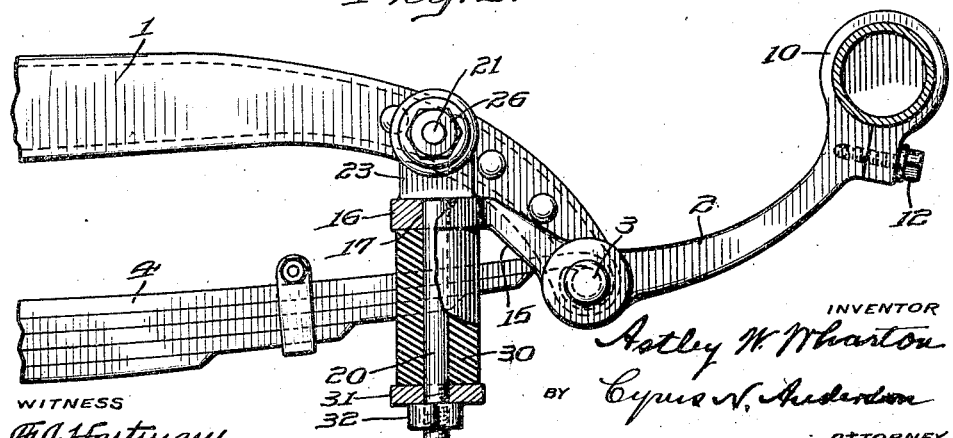

Patented Dec. 4, 1923.

1,476,478

UNITED STATES PATENT OFFICE.

ASTLEY W. WHARTON, OF CHURCHVILLE, PENNSYLVANIA.

AUTOMOBILE BUFFER.

Application filed October 20, 1922. Serial No. 595,756.

*To all whom it may concern:*

Be it known that I, ASTLEY W. WHARTON, a citizen of the United States, and a resident of Churchville, in the county of Bucks and State of Pennsylvania, have invented an Improvement in Automobile Buffers, of which the following is a specification.

My invention relates to buffers which are adapted to be secured either to the front or rear end or both ends of a vehicle such as an automobile, motor truck or the like, for the purpose of protecting such vehicle in case of collision either with another vehicle or with some stationary object.

The general object of the invention is to provide a novel construction of buffer which not only is simple in construction but which is strong and efficient for the purpose for which it is employed.

A further object of the invention is to provide a novel construction of shock absorbing means intermediate the buffer bar and the frame or other component part of the vehicle structure.

Other objects and advantages of the invention will be pointed out in the detailed description thereof which follows, or will be apparent from such description.

In order that the invention may be readily understood and its practical advantages fully appreciated, reference should be had to the accompanying drawing in which I have illustrated one form of mechanical embodiment thereof. However, it will be understood that the invention is susceptible of embodiment in other forms of construction than that shown and that changes in the details thereof may be made within the scope of the claims without departing from the said invention.

In the drawings:—

Fig. 1 is a top plan view of the buffer device embodying my invention and showing the same pivotally connected to the opposite sides of an end portion of a frame or chassis, the front end portions only of which sides are shown; and Fig. 2 is a transverse vertical sectional view taken along the line 2—2 of Fig. 1.

Referring to the drawings, 1 designates the end portions, say the front end portions, of the opposite sides of a frame or chassis of a vehicle, say an automobile, to the forward ends of which the angular levers 2 are pivoted by means of bolts 3 which extend therethrough at the angles between the forwardly and rearwardly extending arms thereof. The said bolts also operate to connect the ends of the side members 1 of the frame to the forward ends of the plate springs 4, a portion of one of which is shown in Fig. 2 of the drawing. The bolts 3 are retained in place by means of castellated nuts 5 which in turn are retained in place by means of cotter pins 6.

It will be observed that the forwardly extending arms of the levers 2 (or rearwardly extending arms in case the said levers should be attached to the rear end of the chassis or frame) extend upwardly and are provided with eyes or loops 10 at their outer ends within which the tubular buffer bar 11 is secured. The eyes or loops 10 are clamped upon the tubular bar by means of screw bolts 12 as indicated in Fig. 2 of the drawing.

The other arms of the levers, that is the arms which extend inwardly with respect to the vehicle structure, also are inclined upwardly as indicated at 15 in Fig. 2 of the drawing, and terminate in a substantially horizontally extending flattened portion 16 through which holes 17 extend. Bolts 20 which depend substantially vertically from the inner ends of the horizontally extending bolts 21 pass through the holes or openings 17 in the flattened and widened end portions 16 of the inwardly extending arms of the levers 2. The bolts 21 extend through holes in the inner sides of the side members 1 of the frame or chassis and are provided upon their outer ends with nuts as indicated at 22. The upper end portions 23 of the bolts 20 are spaced from the inner sides of the frames 1 by means of tubular spacers 25. The upper ends 23 of the bolts 20 are retained in position upon the bolts 21 by means of nuts and washers 26.

The bolts 20, as already indicated, are pivotally suspended from the bolts 21. Mounted upon the bolts 20 below the inner horizontal widened end portions 16 of the inwardly extending arms of the levers 2 are compressible elastic rubber sleeves 30 which are retained in place by means of washers 31 and nuts 32, the latter having screw-threaded engagement with the lower ends of the bolts 20. The parts 30 in the present construction consist of rubber but may consist of other similar suitable elastic material which upon the application of pressure thereto will yield and upon the release of such pressure will return to normal condition thereby returning the parts in engagement therewith or which may be controlled thereby to normal condition or position. The term "rubber" employed in the specification and claims is intended to include not only rubber but also similar material having like characteristics. These rubber sleeves, in the construction illustrated, are cylindrical but may be of any other desired suitable shape.

If a vehicle, such as an automobile truck or the like, should collide with another vehicle or other object, the buffer bar 11 would receive the force of the impact and transmit the same to the frame, but owing to the angular construction of the levers 2 and the presence of the elastic sleeves, 30, the said bar and levers would yield, thereby acting as a cushion to lessen the shock.

By the employment of rubber, or a similar material having like characteristics as a substitute therefor, as cushioning material, I have provided means whereby greater protection is secured against breakage of any of the parts of a vehicle in case of collision. This is due to the fact that in practice the limit of compression of the rubber is not reached so that a cushioning effect is always present; whereas in the case of coiled springs, when such springs have been compressed so that the sides of their coils are in contact there is no further cushioning effect with the result that there is greater probability of injury to the vehicle. This probability is greatly decreased when rubber sleeves such as those indicated at 30 are employed.

Having thus described my invention, what I claim and desire to secure by Letters Patent is:—

1. In a buffer for vehicles, the combination of levers pivoted intermediate their ends to the opposite sides of such vehicles either at the front or rear end thereof, the inner ends of which are provided with openings therethrough, a buffer bar carried upon the outer ends of the said levers, vertically extending bolts supported by the vehicle frame and extending through said openings, and rubber sleeves secured on said bolts underneath the said inner ends and pressing upwardly against the same.

2. In a buffer for vehicles, the combination of levers pivoted intermediate their ends to the opposite sides of such vehicles either at the front or rear thereof, the inner ends of which are provided with openings therethrough, a buffer bar carried upon the outer ends of said levers, bolts supported by the vehicle frame and extending through said openings, rubber sleeves on said bolts one end of each of which is in contact with one side of the inner end of one of said levers, and adjustable means upon the said bolts for retaining the said sleeves thereon and for compressing the same against the inner ends of said levers.

In testimony that I claim the foregoing as my invention, I have hereunto signed my name this 21st day of August, 1922.

ASTLEY W. WHARTON.